(12) United States Patent
Naidu et al.

(10) Patent No.: US 7,337,659 B2
(45) Date of Patent: Mar. 4, 2008

(54) TYRE PRESSURE MONITORING SENSOR

(75) Inventors: Srini Naidu, Northville, MI (US);
Sooriakumar Kathigamasundaram, Singapore (SG); Wai Mun Chong, Johor (MY); Bryan Keith Patmon, Singapore (SG)

(73) Assignee: Sensfab Pte Ltd, Singapore (SG)

( * ) Notice: Subject to any disclaimer, the term of this patent is extended or adjusted under 35 U.S.C. 154(b) by 129 days.

(21) Appl. No.: 11/250,936

(22) Filed: Oct. 14, 2005

(65) Prior Publication Data
US 2006/0032299 A1  Feb. 16, 2006

Related U.S. Application Data

(62) Division of application No. 10/854,416, filed on May 25, 2004, now abandoned.

(51) Int. Cl.
*G01M 17/02* (2006.01)

(52) U.S. Cl. .......................... 73/146; 340/445

(58) Field of Classification Search ........... 73/146; 340/445
See application file for complete search history.

(56) References Cited

U.S. PATENT DOCUMENTS

| | | | |
|---|---|---|---|
| 6,546,982 B1 * | 4/2003 | Brown et al. | 152/152.1 |
| 6,885,291 B1 * | 4/2005 | Pollack et al. | 340/445 |
| 6,899,153 B1 * | 5/2005 | Pollack et al. | 152/152.1 |

* cited by examiner

*Primary Examiner*—Andre J. Allen
(74) *Attorney, Agent, or Firm*—Townsend and Townsend and Crew LLP

(57) ABSTRACT

The present invention relates to an apparatus for remote tire pressure monitoring that is secured onto a wheel surface. The apparatus as a unit comprises or includes a circuit including at least a sensor element to sense air pressure, signal processing circuitry, and data transmitting circuitry and an antenna. The apparatus also comprises or includes a housing at least partially contains the circuit. The housing retains the circuit and the housing and is itself engaged to the wheel surface by adhesion.

3 Claims, 6 Drawing Sheets

Figure 3(a)

TYRE PRESSURE MONITORING SENSOR

TECHNICAL FIELD

This invention relates to a tyre pressure monitoring sensor (TPMS) that can be secured onto a wheel surface and in particular although not solely to such a sensor, for mounting on a wheel rim.

BACKGROUND

A tyre pressure monitoring sensor (TPMS) is an important device to a driver to ensure that the tyres of a vehicle are properly inflated in order to minimize the possibilities of any dangerous situations, especially during driving. Properly inflated tyres play a significant role in maximizing the fuel economy of the vehicle and performance and tyre life of the tyres. However, the tyre-wheel environment can be very hard on electronic products and pressure sensors, exposing them to harsh conditions such as temperature extremes, moisture, debris, and a variety of other potentially corrosive solvents and chemicals.

Therefore, careful TPMS package design is necessary to withstand temperature extremities and encompass all-inclusive media compatibility. The entire TPMS, including the electronics, housing, and mounting hardware, also needs to be lightweight in order to avoid an out-of-balance tyre/wheel. Furthermore, the TPMS should also be positioned at a robust location. The TPMS that is affixed onto the wheel (usually made of aluminum alloy or steel) rather than the tyre, allows the said TPMS to function independently of the tyre. For instance, changing a faulty TPMS would not require changing a new tyre and vice versa.

Currently, conventional TPMSs make use of two types of mounts on the wheel, namely valve mounts and mounting using steel bands, as shown in FIG. 1.

FIG. 1(a) shows a perspective view of the valve mount on a wheel 14. FIG. 1(b) shows the cross-sectional view of the sensor and electronics with the battery potted in a plastic package 10 and mounted to an air pressure valve 12 on the wheel 14. Disadvantages of the valve mount include air leaks (due to loss of residual torque on the sensor mount nut 16 to the wheel valve 12) and the breaking-off of the package 10 from the valve 12 (primarily due to road vibrations, but may also be due to the valve material used and the mount angle to the wheel 14). Additionally, torque profile control is difficult to maintain during the mounting of the plastic package 10 at the wheel supplier.

Another known method to mount a TPMS using a steel band is shown in FIG. 1(c), illustrating a cross-sectional view of the wheel 14. The tyre pressure sensor and RF transmitter with the battery is potted in a plastic housing 18 and then captured in a metal housing 20 that allows the passage of a steel band 22 wrapped around the wheel 14, with the ends of the steel band 22 joined by crimping. A two-sided self adhesive tape 24 may also be used primarily to position the metal housing 20 on the wheel 14 during the banding process, as shown in the exaggerated view of the dotted circle of FIG. 1(c), in FIG. 1(d). The primary method of mounting the tyre pressure sensor assembly is by the steel band 22 that counters the load from high-speed rotation (centripetal acceleration force) and vibrations/shocks from the road. The disadvantage of using a steel band 22 is the danger of the steel band 22 becoming loose at the joint, causing the plastic package 18 to be dismounted during high rotational forces. Furthermore, the assembly process for this design is cumbersome and involves high material and assembly costs.

It is also clear from both the mounting methods described above that physical damage to the plastic package 10 and 18 containing the sensor unit, may occur easily during mount and/or dismount of the tyre on the wheel 14.

Such sensor assemblies for both the said mounting methods are conventionally packed and shipped in dunnages, boxes or fixture nests from the manufacturer to the assembly plant.

Hence, it is accordingly an object of the present invention to provide a tyre pressure monitoring sensor (TPMS) secured or to be secured onto a wheel surface mainly by adhesive means which at least goes someway to addressing the abovementioned disadvantages or which will at least provide the public with a useful choice.

SUMMARY OF THE INVENTION

In a first aspect the present invention consists in an apparatus for remote tyre pressure monitoring secured onto a wheel surface said apparatus as a unit comprising or including, a circuit including at least a sensor element to sense air pressure, signal processing circuitry, and data transmitting circuitry, an antenna and power supply means for said circuit; and a housing which at least partially contains the circuit, whereby the housing retains the circuit and the housing and is itself engaged to said wheel surface by adhesive means.

Preferably whereby the housing is open to said circuit only on that side mounted on the wheel surface.

Preferably said circuit is potted in said housing.

Preferably said housing comprises inner and an outer layer structure.

Preferably said outer layer is a temperature and wear resistant flexible material and said inner layer is a rigid temperature resistant material.

Preferably there is an aperture, in said housing for fluid communication with the exterior of said housing to the interior, communicating with said element to sense air pressure.

Preferably there is adhesive at the interface of said housing and said wheel surface.

Preferably said adhesive is applied to said housing as a pre-assembly.

Preferably said circuit is or includes an integrated circuit.

Preferably said power supply means is a battery.

In a second aspect the present invention consists in an apparatus for remote tyre pressure sensing mounted or able to be mounted onto a wheel surface and exposed or to be disposed to the interior pressurised tyre air space, said apparatus comprising or including, a sensing apparatus comprising at least an element to sense air pressure, a signal processing element to process output from said sensing element, a transmitter element to send a signal from said signal processing element via an antenna to transmit said signal and a power supply means for said sensing apparatus, each in electric communication with each other a housing to at least partially contain said sensing apparatus wherein said housing has an aperture for communication of said air pressure to said element to sense air pressure, and said housing is secured or is to be secured to said wheel surface by adhesive means, capturing said sensing apparatus against said wheel.

Preferably said sensing apparatus is or includes an integrated circuit.

Preferably said transmitter element is of a kind to send said signal via said antenna by electromagnetic frequency.

Preferably said signal is in the radio frequency spectrum, substantially between 10 kilohertz and 100,000 kilohertz frequencies.

Preferably said antenna and said transmitter element are adapted to receive as well as transmit.

Preferably said sensing apparatus is potted in said housing.

Preferably said adhesive is applied to one or both of said wheel surface and said housing prior to securing to each other.

Preferably said adhesive is pre-applied to said housing.

Preferably said unit is serially packaged with adhesive pre-applied, substantially ready for securing to said wheel surface.

Preferably a removable liner protects said adhesive prior to securement to said wheel surface.

Preferably said wheel surface is on a wheel rim.

Preferably the wheel and tyre assembly is of a tubeless kind.

Preferably said housing comprises an inner rigid material and an outer compliant and wear resistant material.

Preferably said power supply means is a battery

In a third aspect the present invention consists in a method of remotely sensing vehicle tyre gas pressure using a gas pressure sensing and transmitting means potted inside a housing, said housing is in turn secured to a surface of a wheel inside the pressurized gas compartment at least in part bounded by said tyre and wheel by adhesive means only said method comprising sensing, at a location remote from said tyre, the signal from said gas pressure sensing and transmitting means.

In a fourth aspect the present invention consists in a vehicle with a tyre pressure monitoring unit secured to any one or more of the wheels of said vehicle, wherein said unit comprises or includes, a sensing apparatus comprising at least an element to sense air pressure, a signal processing element to process output from said sensing element, a transmitter element to send a signal from said signal processing element via an antenna to transmit said signal and power supply means for said sensing apparatus and a housing to at least partially contain said sensing apparatus, wherein said unit is mounted to a wheel surface exposed to the interior pressurised tyre air space and said housing has an aperture for communication of said air pressure to said element to sense air pressure.

Preferably said housing is secured or is to be secured to said wheel surface by adhesive means, capturing said sensing apparatus against said wheel surface.

In a fifth aspect the present invention consists in a wheel with a tyre pressure monitoring unit secured to any one or more of the wheels of said vehicle, wherein said unit comprises or includes, a sensing apparatus comprising at least an element to sense air pressure, a signal processing element to process output from said sensing element, a transmitter element to send a signal from said signal processing element via an antenna to transmit said signal and power supply means for said sensing apparatus and a housing to at least partially contain said sensing apparatus, wherein said unit is mounted to a wheel surface exposed to the interior pressurised tyre air space and said housing has an aperture for communication of said air pressure to said element to sense air pressure.

Preferably said housing is secured or is to be secured to said wheel surface by adhesive means, capturing said sensing apparatus against said wheel surface.

In a sixth aspect the present invention consists in a tyre pressure monitoring device secured onto a wheel surface said device comprising:

an electronic circuit consisting of sensor elements, a signal processing circuitry, a RF circuitry, an antenna and power supply means for said electronic circuit and a housing which holds the integrated circuit, is made of at least an inner more layer and an outer more layer;

whereby the inner more layer encloses all sides of the circuit, except for a side in contact with the wheel surface, and the outer more layer overlays the circuit covered by the inner more layer, and wherein the outer more layer is engaged to the wheel surface by adhesive means.

In a seventh aspect the present invention consists in an apparatus for remote tyre pressure monitoring for securing onto a wheel surface said apparatus as a unit comprising or including a circuit including at least a sensor element to sense air pressure, signal processing circuitry, and data transmitting circuitry, an antenna and power supply means for said circuit, and a housing which at least partially contains the circuit, whereby the housing retains the circuit and the housing itself is to be engaged to said wheel surface by adhesive means.

In an eighth aspect the present invention consists in a method of packaging a remote tyre pressure monitoring unit for subsequent assembly by association with a wheel, said method comprising or including, separately and serially encapsulating said unit between a cover layer and encapsulation layer, one or both of which layers are conformed to at least partially locate said unit, said layers being adhered to one another to retain said unit between them, wherein said resulting serial separately packaged units are wound onto a reel to form a tape and reel package for subsequent serial presentation of units, upon removal or at least one of said layers, prior to mounting.

Figure 1A:
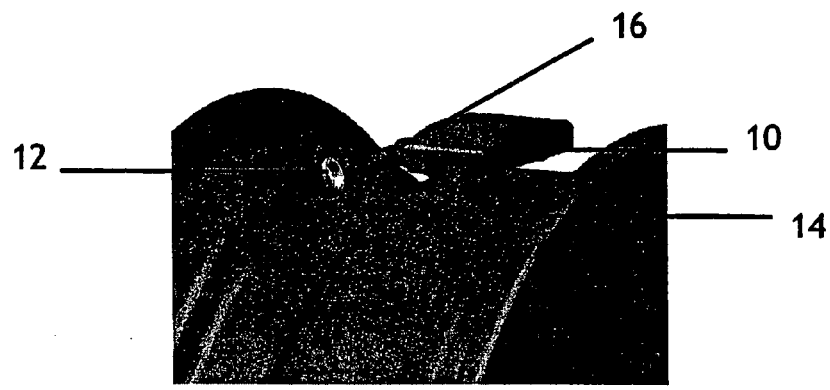
FIG. 1(a) shows a perspective view of a first known method (valve mount) of mounting a tyre pressure monitoring sensor (TPMS) onto a wheel.
Figure 1B:
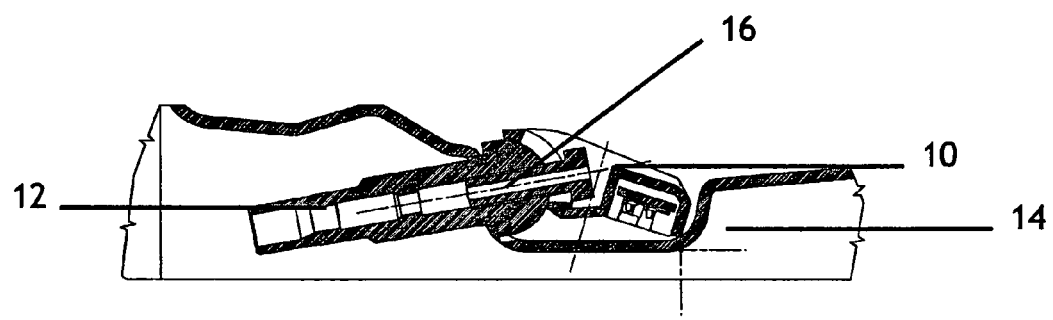
FIG. 1(b) illustrates the cross-sectional view of the TPMS of FIG. 1(a) valve-mounted onto the wheel.
Figure 1C:
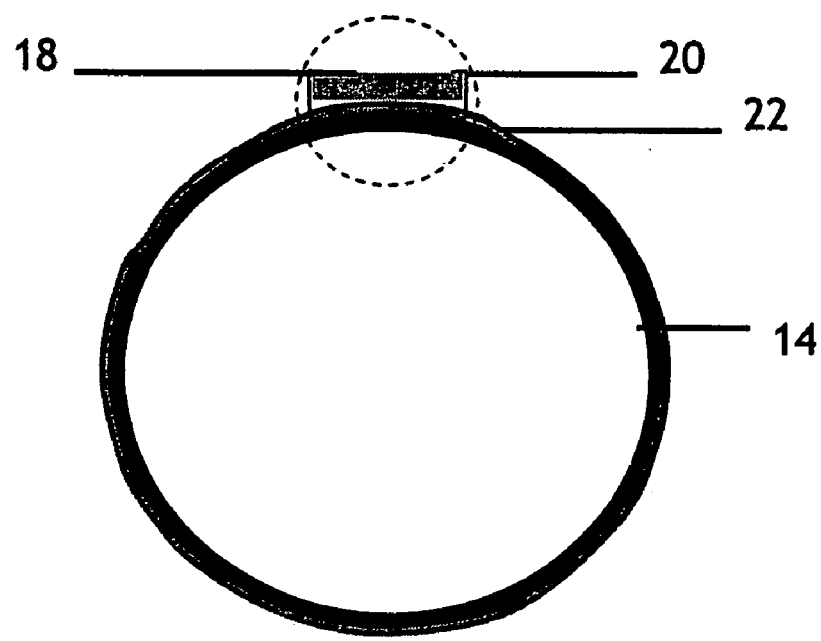
FIG. 1(c) shows a cross-sectional view of a second known method (using a steel band) of mounting a TPMS onto a wheel.
Figure 1D:
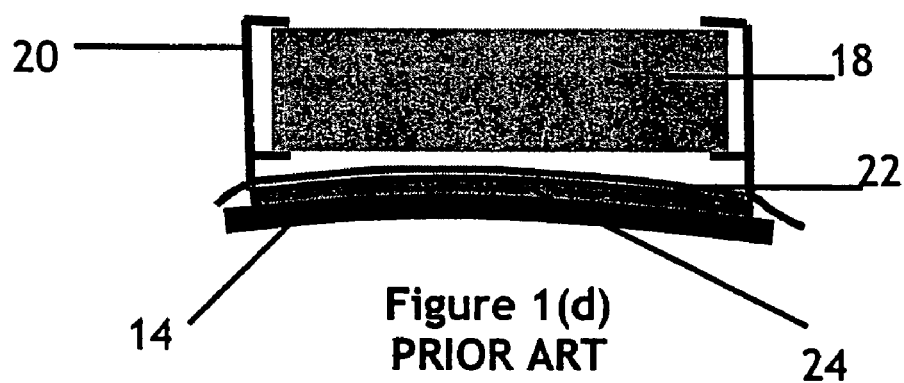
FIG. 1(d) is an exaggerated cross-sectional view of a section of the steel band enclosed in a dotted circle in FIG. 1(c).
Figure 2A:
Figure 2B:
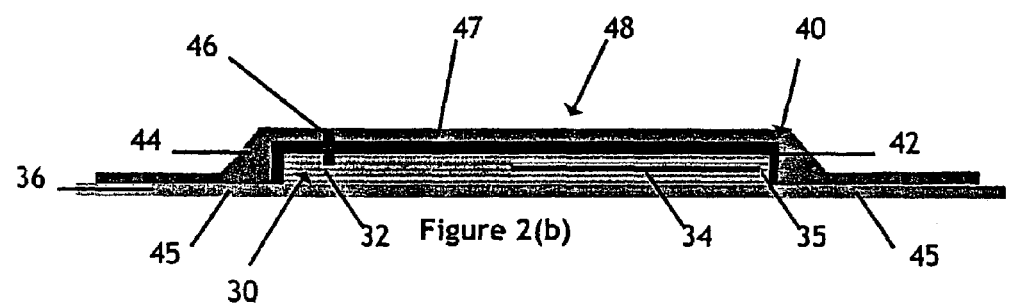
Figure 2C:
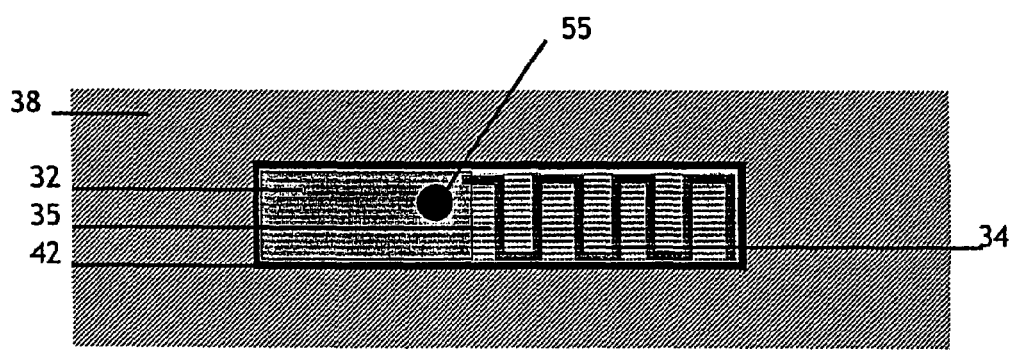
Figure 3A:
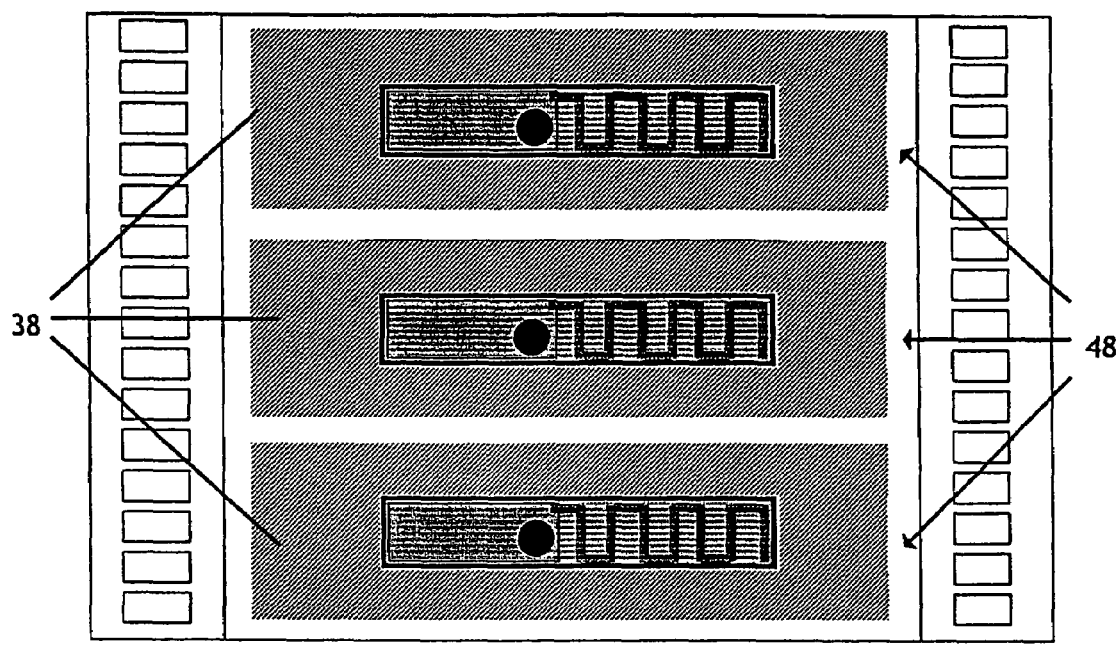

A tyre pressure monitoring sensor in accordance with the invention will now be described by way of example with reference to the accompanying drawings in which:

FIG. 2(a) shows a first plan view of one preferred embodiment of a TPMS assembly from the outermost layer, FIG. 2(b) illustrates the cross-sectional view of one preferred embodiment of the TPMS assembly on a wheel surface, FIG. 2(c) shows a bottom view of one preferred embodiment of the TPMS assembly from the adhesion surface, FIG. 3(a) shows a plan view of a surface mount style tape and reel package of a series of the preferred embodiments of the TPMS assemblies from the adhesion (or bottom) surface.

Figure 3B:
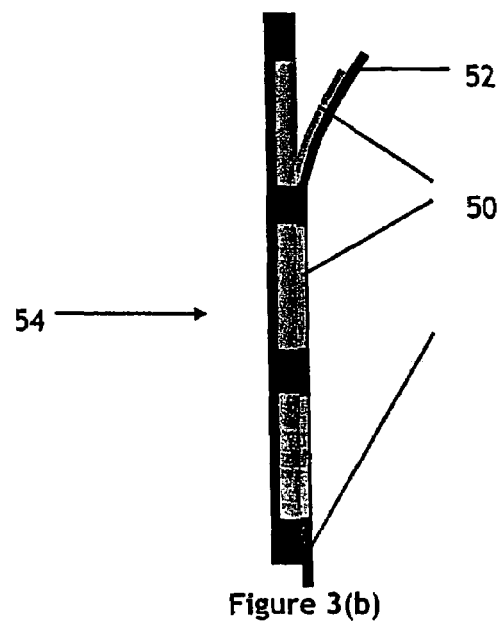

FIG. 3(b) shows a cross-sectional view of the tape and reel package of a series of the preferred embodiment of the TPMS assemblies as shown in FIG. 3(a), illustrating the removal of the protective film and the liner before the application of the preferred embodiment of the TPMS assembly.

Figure 4:
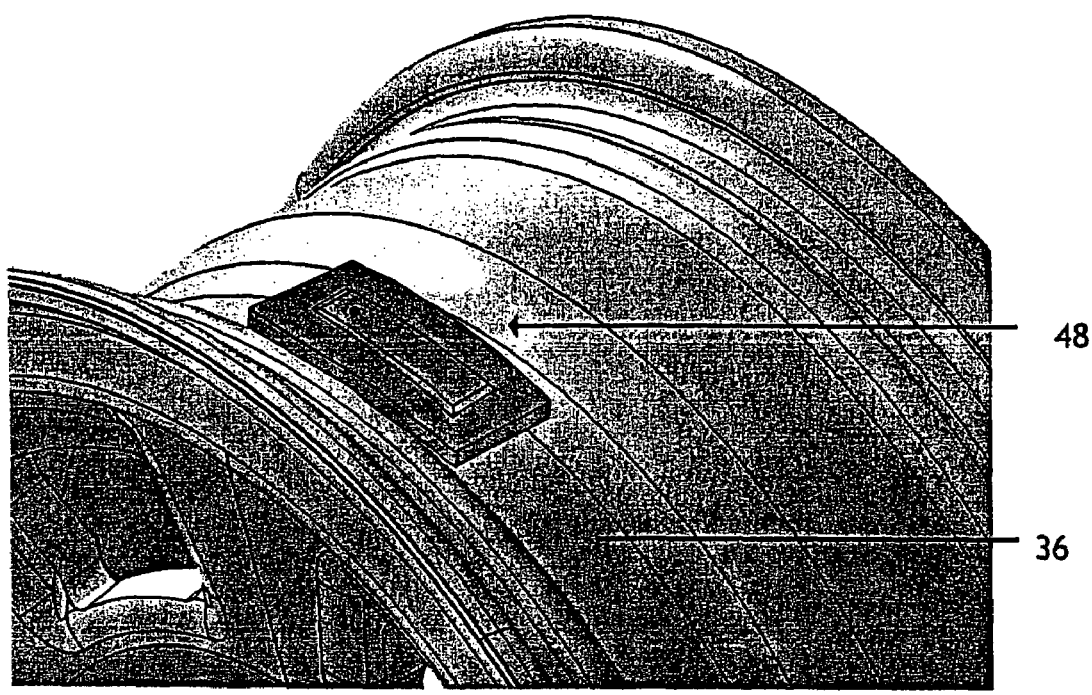

FIG. 4 shows a perspective view of the preferred embodiment of the TPMS assembly applied onto the wheel surface.

Figure 5:
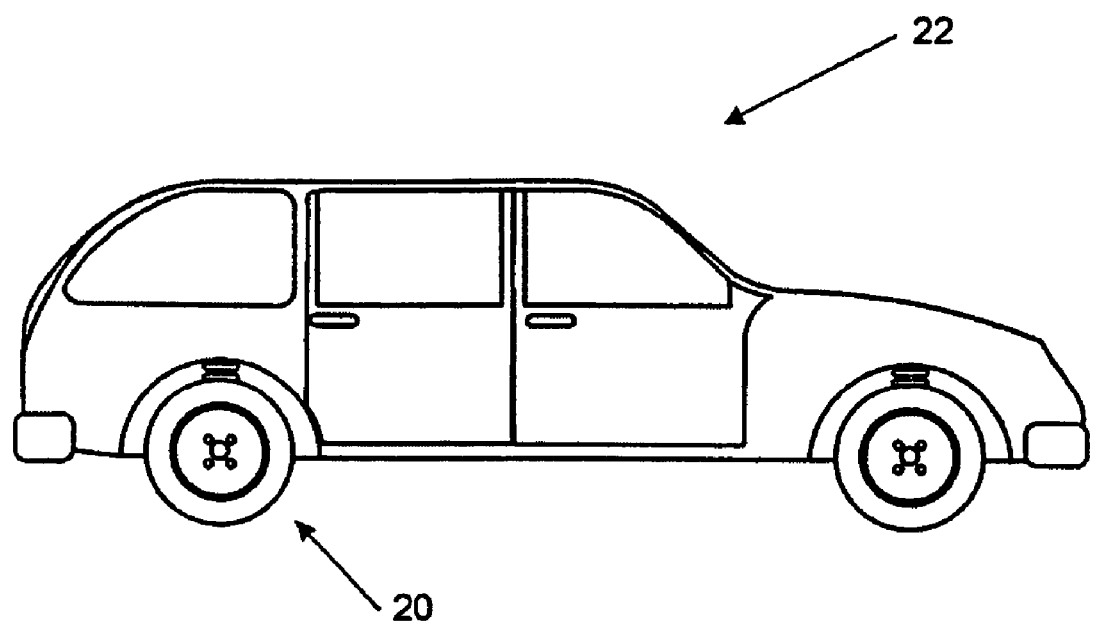

FIG. 5 shows a vehicle having wheels in accordance with the present invention.

DETAILED DESCRIPTION OF THE INVENTION

An embodiment of the invention will now be described by way of example only with reference to the accompanying drawings in which FIG. 2 shows a preferred embodiment of the Tyre Pressure Monitoring Sensor (TPMS). Is it to be understood that a pneumatic wheel 20 assembly (e.g. for a car 22 or truck or other such wheeled vehicle) consists of a wheel rim to which is tubelessly mounted a tyre to define an air tight chamber within which the TPMS unit is mounted.

FIG. 2(b) illustrates a cross-sectional view of a tyre pressure monitoring system (TPMS) unit 30 with circuitry. In the preferred embodiment the circuitry comprises an Integrated Circuit (IC) 32 of sensor elements, signal processing circuitry and Radio Frequency (RF) circuitry, as well as an antenna 34. Power supply means for energizing the circuit are also included. Such power supply means may be a battery 55, antenna and means for inductive power transfer, or other such ways to supply power known in the art.

The sensor elements preferably include mainly a pressure sensor. In an alternative form, it may also include an acceleration sensor and/or temperature sensor. The antenna 34 can be of any shape or form as found convenient and effective.

In all places where the radio frequency circuitry is described as consisting of an RF transmitter and antenna, it should be understood that the circuitry is optionally for receiving as well.

It is to be understood however that all, only some or none of the components maybe incorporated into an integrated circuit, but rather there maybe discrete components comprising the circuit. Where IC is mentioned this is therefore understood to also mean discrete rather than an integrated circuits. Radio frequency is understood to mean that part of the electromagnetic spectrum approximately between 10 kilohertz (kHz) to 100,000 kHz.

The integrated circuit 32 and the antenna 34 (and/or other electronic components) are held relative to each other together by a potting material 35. The potting material proofs the IC and antenna from the physical environment and reduces the relative movement of the components to each other and the housing, thus reducing vibration and environmental induced damage to the TPMS unit. The potting material also helps insulate the system electrically and aids in heat dissipation.

The TPMS unit 30 is contained within a housing 40, the housing 40 comprising preferably at least an innermost layer 42 and an outermost layer 44. In another embodiment, the housing 40 may be comprised of at least the outermost layer 44. The inner layer for example may be a high temperature withstanding plastic material (such as glass-filled polyamide—PA66) and the outer layer may be a high temperature and wear withstanding and flexible material (such as rubber based materials). Further layers may also be present such as a shielding layer to reduce or prevent electromagnetic interference either by or to the IC (except for that area of the antenna, or designed to allow the RF antenna frequencies only to pass). A thermal and/or electrically insulating layer lay also be present if required.

During use, the TPMS unit 30 is secured onto a wheel surface 36 primarily and preferably solely by an adhesive means. FIG. 2(c) illustrates the adhesive means by adhesive 38, which can be found on the lower or bottom surface 41 of the housing 40. In particular, the adhesive 38 may be found at the interface of the sensor package housing bottom 41 and wheel surface 36. In one embodiment, the outermost layer 44 may be self-adhesive such that the adhesive 38 is inherent to the outermost layer 44.

In an alternative embodiment, the adhesive 38 may be separately dispensed onto the surface 45 of the outermost layer 44 and/or the wheel surface at a region where it is to be attached. Such dispensing may be part of a preassembly operations or immediately before attachment to the wheel rim. Heat may be used to facilitate and/or improve the strength and/or adhesion time (to speed the manufacturing process) of the adhesive bond between the housing 40 and the wheel surface 36. The adhesive 38 primarily provides sufficient strength for the TPMS unit 30 to counteract the centripetal forces generated by the rotation of the wheel. The adhesive strength and the area of adhesion of the outermost layer 44 then provide two independent control methods to generate optimum fastening of the TPMS unit 30 onto the wheel surface 36 to counteract such force.

The housing 40 serves to isolate and protect the TPMS unit 30 from environmental effects such as moisture, temperature extremes, debris and corrosive solvents and chemicals. The housing 40 may be profile molded in order to create a contoured surface where the TPMS unit 30 can be positioned. The housing may be further contoured to match the surface and/or radius of the wheel to which it is to be attached. In one embodiment, the innermost layer 42 is an injection-molded layer providing the seating contours for the TPMS unit 30. The innermost layer 42 is preferably made of a high-temperature withstanding plastic material such as glass-filled polyamide (also known as PA66). The outermost layer 44 is then over-molded the innermost layer 42. Such a housing may be manufactured by known processes, such as but not limited to injection molding, forming, blow molding, stamping, machining or similar.

The outermost layer 44 is preferably of a dense protective layer and made of a high-temperature and wear withstanding, flexible and/or elastomeric material such as rubber based material. The layer 44 will then function as toughened protection against any wear and tear of the TPMS unit 30 from, for example, tyre mounting. The outermost layer 44 should also be flexible enough to conform to the contours of the wheel surface 36. In this way interferences due to the mount and dismount of the tyre from the wheel surface 36 may be further minimized.

The outermost layer 44 may also include, for example, bar coding, part numbers or laser etching, on any of its surface but preferably on upper surface 47, so as to enable part identification and also for coding purposes.

The housing 40, being multi-layered and hence multi-material, not only enables the choice to vary surface hardness(es), but also allows for the flexibility of inserting additional layers, such as one that is thermally insulating, beneath the outermost layer 44.

There exists an aperture 46, preferably created by a plastic or similar material member, or simply by an aperture in the housing 40, such that there is an access path to transmit the housing external pressure (i.e. internal tyre) to the sensor element within the integrated circuit 32. The aperture 46 should also be located in a favorable position, within close proximity of the sensor element within the integrated circuit 32, so as to avoid debris, tyre-mount grease, lubricants or contaminants from shipping.

The TPMS unit 48, comprising the housing 40 and the TPMS unit 30, is packaged in a tape and reel form 54, similar to surface mount technology tape and reel systems, for example, as shown in a plan view of three serially presented TPMS units 48 from the adhesive side 38 in FIG. 3(a). The tape of the reel having perforations for engagement with like teeth, on a tape and reel machine, to advance the tape incrementally.

FIG. 3(b) shows a cross-sectional view of the three TPMS units 48 when packaged in the tape and reel form. The adhesive 38 on each of the TPMS unit 48 is each protected with a liner 50, and a protective film 52 seals the tape and reel package 54. Thus each TPMS is contained and sealed within an individual container serially connected to like containers.

During application of each of the TPMS assembly 48 onto the wheel surface 36, the liner 50 is peeled off together with the protective film 52, from the tape and reel package 54, to subsequently serially present each TPMS assembly 48 for its immediate use. FIG. 4 illustrates the completed application of the TPMS assembly 48 onto the wheel surface 36.

The TMPS once serially presented may, by for example but not limited to, be located on the wheel rim surface by a pick and place machine so that the assembly is automated. In the absence of adhesive (as described) on the TPMS unit adhesive may be applied during or prior to the transfer, to the wheel surface, or may be separately placed on the wheel surface prior to the location of the TPMS unit. The unit may also be placed onto the wheel by hand, or using a combination of machines and hands. Adhesive, if not already applied may be applied by hand or by machine. The adhesive may be in the form of a liquid or fluid material or may be an adhesive strip.

It should be noted that during the manufacturing process, the TPMS assembly 48 would be assembled onto the wheel surface 36 first, after which the tyre (not shown) may be mounted onto the wheel and then pressurized. The optimal location of the TPMS assembly 48 on the wheel surface 36 will vary depending on the wheel design. For example in a wheel rim with a valley running circumferentially around the rim in the centre of the wheel the best location for the TPMS may be in this valley as it is less prone to damage during tyre assembly/removal and is subject to the least centripetal force due to the lowest radius. The TPMS packaging is preferably manufactured to follow the contours of the wheel in the desired mounting location.

Other possible locations are those on the wheel which place the TPMS closest to the transmitter/receiver of the RF signal, to reduce for example any interference. This could be any location on the wheel surface, such as the side wall closest to the receiver, or the highest elevated surface available for the mounting. Mounting in any location is possible due to the flexible nature of this TPMS package.

There is a querying, wake-up or initiation method (activation signal) used, to communicate commands to the TPMS wheel sensor to initiate usage (start sensing and transmitting for the first time). In use the TPMS may be activated by receiving an activation signal. The activation signal may be from the vehicle's on board transmitter/receiver or may be from a separate transmitter/receiver source. In the preferred embodiment the activation signal is a different frequency, lower than that, of the data signal containing the tyre pressure from the TPMS. In other embodiments the activation signal may be the same or higher frequency than the data signal from the TPMS. The activation signal may also send program parameters to the TPMS, these may be on a different or same frequency again.

There is also a separate location signal for requesting identification of the sensor, so that the location/wheel position (front or rear axle, left or right, or spare) of a particular sensor can be identified. This is called localization. In the preferred embodiment the location signal is a different frequency, lower than that, of the data signal containing the tyre pressure from the TPMS. In other embodiments the location signal may be the same or higher frequency than the data signal from the TPMS.

An illustrative use of such signals is once the wheels, with TPMS units in place, are attached to a vehicle they are activated to send at least data signals to a receiver or receivers on the vehicle. A location signal may also be sent to the TPMS unit and thence from the unit in reply, to indicate the unit's location on the vehicle. Alternatively a location signal only may be sent from the unit. If a spare wheel is located on the vehicle (whether a "space saver" wheel or not) this may be optionally activated at the time of changing a tyre, or may be activated only periodically whilst it is the spare wheel to maintain a watching check on the spare wheel's pressure.

In another embodiment the TPMS unit may remain dormant until polled by a signal from the transmitter/receiver, at which time it will send a data signal indicating the tyre pressure and then return to a dormant state.

These commands/signals may be executed during vehicle assembly, using manufacturing equipment or hand held devices in repair stations or from the vehicle itself. These methods are currently used and not a part of this invention.

The invention claimed is:

1. A method of packaging a remote tyre pressure monitoring unit for subsequent assembly by association with a wheel, said method comprising, separately and serially encapsulating a plurality of said units between a film layer and encapsulation layer, one or both of which layers are conformed to at least partially enclose said units, said layers being adhered to one another to retain said units between them, wherein said resulting separately and serially encapsulated units are wound onto a reel to form a tape and reel package for subsequent serial presentation of units, upon removal or at least one of said layers, prior to mounting.

2. A method according to claim 1, wherein the film layer may comprise a liner to protect an adhesive coating on the units.

3. A method according to claim 1, wherein the separately and serially encapsulated units are separated by perforations in the film layer.

* * * * *